United States Patent Office 2,710,852
Patented June 14, 1955

2,710,852

RESINS FROM CYANOACYL HYDRAZIDES

Thomas Boyd, Springfield, Mass., assignor to Monsanto Chemical Company, St. Louis, Mo., a corporation of Delaware No Drawing. Application August 22, 1951,
Serial No. 243,184

7 Claims. (Cl. 260—72)

This invention relates to new thermosetting resins. More particularly the invention relates to resins derived from cyanoacyl hydrazides.

One object of this invention is to provide new thermosetting resins.

A further object is to provide thermosetting resins from cyanoacyl hydrazides.

Another object is to provide a process for preparing thermosetting resins from cyanoacyl hydrazides.

These and other objects are attained by treating cyanoacyl hydrazides with iodine, and condensing the product with an aldehyde or a ketone and, if desired, reacting the product with an alcohol or a phenol.

The following examples are given in illustration and are not intended as limitations on the scope of this invention. Where parts are mentioned they are parts by weight.

*Example I*

Dissolve 100 parts of cyanoacetyl hydrazide in 700 parts of ethanol. Saturate another 700 parts of alcohol with iodine at about 20° C. Mix the two solutions and allow the mixture to stand at 20 to 30° C. for about 3 days. A white precipitate of needle-like crystals forms during the reaction period. The crystals decompose without melting.

*Example II*

Dissolve 100 parts of the crystals obtained in Example I in 200 parts of formalin (37% formaldehyde) and heat the solution to 50° C. Continue heating the solution until all of the water and any excess aldehyde is evaporated. The product is a solid clear resinous material which is soluble in organic solvents and in water and is fusible. The fusible resin may be cured by heating it at temperatures of 120 to 200° C. for a short time. The fusible resins may be dissolved in appropriate solvents and used in coating and impregnating compositions or they may be compounded and molded under heat and pressure into infusible articles.

If the formalin of Example II is replaced by an aqueous solution containing 195 parts of methyl ethyl ketone, similar results are obtained.

*Example III*

Dissolve 100 parts of the fusible resin obtained in Example II in 100 parts of methanol. Heat the solution to reflux temperature at atmospheric pressure. Continue the heating at reflux for about 30 minutes and then cool the reaction mixture. The product is a methanol solution of the methyl ether of the aldehyde condensation product. On removal of the methanol a viscous clear liquid is obtained which is soluble in common organic solvents. Solutions of the ether may be used in coating and impregnating compositions. The ether resins may be cured by heating them to 120 to 200° C. to provide insoluble infusible coatings and impregnants.

The resins of this invention are prepared by the treatment of cyanoacyl hydrazides with iodine followed by condensation of the product with aldehydes or ketones. The cyanoacyl hydrazides have the following formula

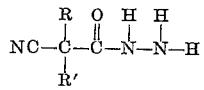

wherein R and R' may be hydrogen or an alkyl, aryl, aralkyl or alkenyl group. Examples of such groups are methyl, ethyl, propyl, butyl, isobutyl, lauryl, phenyl, naphthyl, benzyl, phenethyl, allyl, methallyl, etc. groups. The hydrazides are formed by reacting the esters of the corresponding cyanoacids with hydrazine in substantially equimolecular quantities and in an aqueous medium.

The cyanoacyl hydrazides react with iodine to yield generally crystalline products which decompose before the melting point of the crystals is reached. The iodine is recovered from the reaction medium in the form of hydriodic acid and does not enter into the organic compound. At least one mol of iodine is necessary for each mol of cyanoacyl hydrazide. An excess of iodine may be used if desired.

The materials obtained by the treatment of the cyanoacyl hydrazides with iodine condense with aldehydes and ketones at temperatures from 20 to 100° C. to yield soluble fusible resins which may be cured to the insoluble infusible state at 120 to 200° C. Aliphatic, aromatic and heterocyclic aldehydes and ketones may be used. They may contain organic substituents such as alkoxy and aryloxy groups. The amount of aldehyde or ketone may vary from 0.5 to 2 mols per mol of the modified cyanoacyl hydrazide. An excess of aldehyde or ketone may be used with the excess being recovered at the end of the condensation reaction.

If desired the aldehyde or ketone condensation products may be further modified by reacting the fusible condensation resins with an alcohol or phenol. Aliphatic, aromatic, saturated and unsaturated alcohols may be used. Both alcohols and phenols may contain substituents such as halogeno, cyano, nitro, amine, etc. groups. The amount of alcohol or phenol which will react with the condensation product is from 0.1 to 1.0 mol per mol of aldehyde or ketone used in preparing the condensation product. However, a large excess of alcohol or phenol is frequently used to act as a solvent for the reaction and for the reaction product. If desired, other common solvents such as aliphatic, aromatic and halogenated hydrocarbons may be used either in conjunction with an alcohol or phenol solvent or in lieu thereof. The etherification reaction occurs at temperatures ranging from 20° C. to 100° C. The etherification products range from viscous liquids to soft solids. They are particularly useful in coating and impregnating compositions. They may be cured to an insoluble infusible state by heating them at 120 to 200° C. for a short time.

None of the steps in the process of this invention requires a catalyst. The reaction with iodine is best carried out at temperatures from 10 to 50° C. in the absence of a catalyst. The condensation reaction may be accelerated by the addition of either an acid or an alkaline catalyst and the etherification reaction may be accelerated by acidic compounds. If desired the condensation and etherification may be carried on simultaneously by using the etherification alcohol as the solvent for the condensation reaction.

It is obvious that variations may be made in the processes and products of this invention without departing from the spirit and scope thereof as defined in the appended claims.

What is claimed is:

1. A thermosetting resinous heat reaction product prepared by reacting a carbonyl compound taken from the group consisting of aldehydes and ketones with the product prepared by treating a cyanoacyl hydrazide with at least 1 mol of iodine per mol of hydrazide, said cyanoacyl hydrazide having the formula

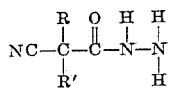

wherein R and R' are taken from the group consisting of hydrogen and alkyl, alkenyl, aryl and aralkyl radicals.

2. A thermosetting resinous heat reaction product as in claim 1 wherein the cyanoacyl hydrazide is cyanoacetyl hydrazide.

3. A thermosetting resinous heat reaction product as in claim 1 wherein the carbonyl compound is formaldehyde.

4. A thermosetting resinous heat reaction product prepared by reacting a hydroxyl compound taken from the group consisting of alcohols and phenols with the resinous heat reaction product prepared by reacting a carbonyl compound taken from the group consisting of aldehydes and ketones with the product prepared by treating a cyanoacyl hydrazide with at least 1 mol of iodine per mol of hydrazide, said cyanoacyl hydrazide having the formula

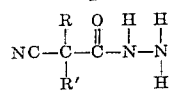

wherein R and R' are taken from the group consisting of hydrogen and alkyl, alkenyl, aryl and aralkyl radicals.

5. A thermosetting resinous heat reaction product as in claim 4 wherein the cyanoacyl hydrazide is cyanoacetyl hydrazide.

6. A thermosetting resinous heat reaction product as in claim 4 wherein the carbonyl compound is formaldehyde.

7. A thermosetting resinous heat reaction product as in claim 4 wherein the hydroxyl compound is methanol.

References Cited in the file of this patent

UNITED STATES PATENTS

| | | |
|---|---|---|
| 2,471,243 | Rust | May 24, 1949 |
| 2,631,991 | Boyd | Mar. 17, 1953 |

OTHER REFERENCES

Rothenberg: Berichte Deut. Chem. Gesel., vol. 27 (1894), pp. 688 and 689.